Patented Mar. 8, 1932

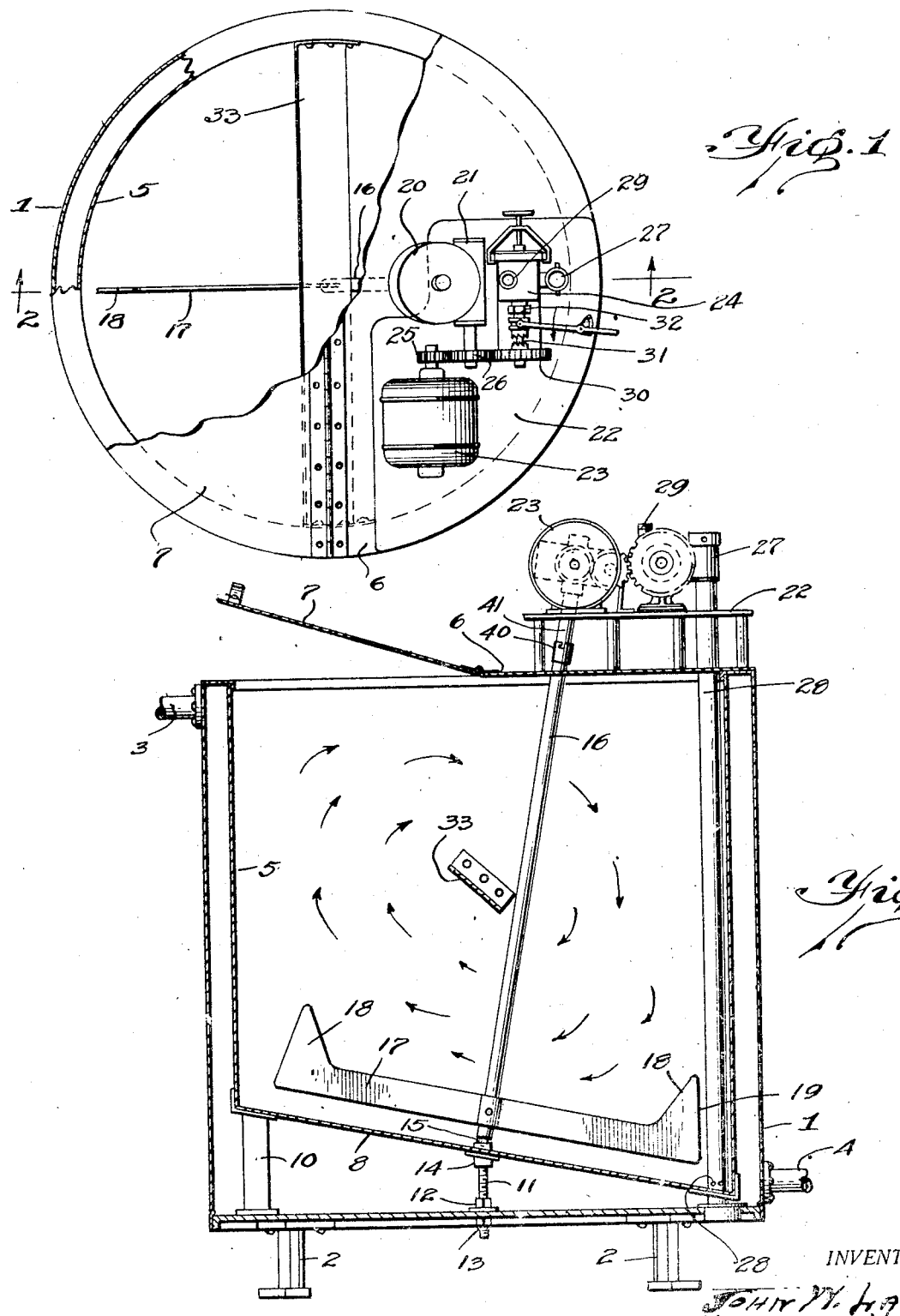

1,848,957

UNITED STATES PATENT OFFICE

JOHN W. LADD AND HENRY B. WILLIAMS, OF DETROIT, MICHIGAN, ASSIGNORS, BY MESNE ASSIGNMENTS, TO CHERRY-BURRELL CORPORATION, OF WILMINGTON, DELAWARE, A CORPORATION OF DELAWARE

PASTEURIZING APPARATUS

Application filed September 4, 1928. Serial No. 303,920.

This invention relates to pasteurizing apparatus, and its object is to provide an inexpensive and efficient device for the pasteurization of liquids, more particularly milk, adaptable for use in pasteurizing small quantities of liquid and not requiring the use of expensive power apparatus in the operation thereof.

Apparatus of this character commonly in use by dairies requires considerable machinery including a power plant for operation thereof and is expensive in character. Therefore, small dairies are unable to avail themselves of such apparatus, and the purpose of this invention is to provide a small inexpensive apparatus within the purchasing power of small plants usually found in country villages.

A feature of the invention is involved in the means by which a body of liquid being treated is so agitated during the pasteurizing operation that the entire contents of the liquid container is subjected to approximately the same temperature throughout. In similar apparatus heretofore provided for this purpose in which a body of liquid is subjected to heat by means of a steam or water jacket or the like, the central portion of the body of liquid out of contact with the heated walls is not subjected to the same degree of temperatures as that in contact with the walls.

The principal feature of this invention is in the provision of means for causing the entire cubical content of the liquid container to be continuously carried to contact with the heated walls thereof.

Other features are involved in the mechanism for operating the agitator and the mechanism by means of which the pasteurized liquid may be removed at will from the container.

These and other objects and novel features of the invention are hereinafter more fully described and claimed and the preferred form of apparatus embodying our invention is shown in the accompanying drawings in which—

Fig. 1 is a plan view of our improved pasteurizer.

Fig. 2 is a vertical section taken on line 2—2 of Fig. 1 in which the flow of liquid by operation of the agitator is indicated by arrows.

The apparatus consists principally of an outer receptacle of cylindrical form indicated at 1 and preferably supported by legs two of which are here shown. This receptacle has the inlet and outlet pipe 3 and 4 at the top and bottom respectively for flow of heated fluid therethrough, preferably water, the temperature of which is sufficient to raise the temperature of the liquid in the inner receptacle 5 to pasteurizing temperature—namely, 144 degrees F. The upper ends of the inner and outer receptacles terminate in the same plane and a cover 6 may be provided therefor having a hinged portion 7 permitting fluid to be pasteurized to be introduced into the receptacle 5 and which also permits examination of the fluid being treated.

The inner receptacle 5 is cylindrical in form and has a bottom portion 8 lying at an angle to the vertical axis of the receptacle as indicated. This inner receptacle may be supported in any convenient manner within the outer receptacle as by means of a bracket 9 at its lower side and a similar bracket 10 at the upper side there being a sufficient number of brackets or supports employed to secure the inner receptacle in place and support the weight thereof. Centrally of the bottom of the two receptacles is a threaded standard 11 which is adjustable in height by the nuts 12 and 13 on opposite sides of the bottom of the outer receptacle 1. The upper end of this standard has a head 14 the upper end of which provides a ball like support 15 for the rotatable agitator shaft 16 which lies at an angle to the axis of the inner receptacle and standard 11, the agitator shaft 16 being positioned at a right angle to the inclined base 8 of the inner receptacle. The lower end of this shaft 16 and spaced above the bottom end of the base 8 is an inclined agitator blade 17 which has its opposite ends arranged with upstanding triangular terminal portions 18. The outer edge of the portion indicated at 19 is parallel to the side walls of the inner receptacle on the lower side and these edges 19 are spaced a slight distance from the wall of the inner receptacle as shown. The agitator shaft is driven by means of a worm wheel within a casing 20 which is driven by a worm in the casing 21 shown more clearly in Fig. 1. The worm wheel is connected to a shaft 41 and the shaft 41 is connected to the agitator shaft 16 by a bayonet coupling 40.

The casing for the worm and the worm wheel is supported on a stationary plate 22 supported on the cover 6 of the receptacles as is also the electric motor indicated at 23 and a pump 24. The motor shaft is provided with a gear 25 which meshes with a gear 26 on the worm shaft so that operation of the motor rotates the worm, worm gear and agitator and its shaft. The pump may be of any approved type preferably of centrifugal form, the inlet of which is connected through the housing 27 with the intake pipe 28 leading to the bottom of the inner receptacle, the pipe being apertured at 28 to provide for ingress of liquid. The discharge line of the pump is indicated at 29 to which a hose may be connected. The pump is provided with a gear 30 meshing with the gear 26 there being a clutch 31 to connect the gear 30 with the shaft 32 of the pump so that the pump may be connected at will with the motor. There is also the baffle plate 33 extending centrally across the inner receptacle 5 above the agitator and lying at an angle to its vertical axis and to the agitator shaft as indicated. This baffle is of sheet metal form and its purpose will be understood from the following—

By reason of the inclined bottom of the inner receptacle and the parallel relation of the agitator rotatable on an axis at a right angle to the inclined bottom a rolling motion of the fluid is caused, it tending to flow upward from the lower side as indicated by the several arrows toward the upper end and opposite side of the receptacle.

The baffle, by reason of its inclination and position, tends to break up this rolling motion and prevents maintaining a core of the liquid centrally of the receptacle out of contact with the outer walls. By means of this baffle this rolling body of liquid is broken and the central portion thereof is deflected toward the outside and thus causing all parts of the liquid body to contact the heated walls of the receptacle. It will be observed that there is a continual flow of the liquid passing from the lower side of the receptacle 5 toward the opposite upper end thereof and thence across and downward to the lower side and the baffle effectually breaks this continuity of flow or rolling action as above stated so that the central portion is caused to pass to the outside in the travel of the liquid from and to the agitator.

I am aware that rotating paddles have been heretofore used but such agitators are more or less insufficient as they are usually rotating about the vertical axis of the receptacle and no rolling motion or particular circuitous path in the flow of liquid is produced by their operation. By our improved construction and arrangement of the receptacle and agitator a new agitating action is secured and the result of its use is to cause all particles of liquid to come to contact with the heated walls of the receptacle and therefore all particles are raised to like temperature in a like period of time.

Therefore no portion of the liquid being treated is brought to pasteurizing temperature materially sooner than other portions and overheating portions of liquid in order to secure adequate heating of the other portions is avoided. This is very desirable inasmuch as the overheating of a portion of the liquid, in case milk is being pasteurized, tends to impart a "cooked" taste thereto which would tend to contaminate the entire body.

From the foregoing description it is evident that the apparatus is simple and inexpensive in character and therefore adaptable for use in small dairies as no particular power equipment other than a small motor for operation of the agitator is required in conjunction with the means for providing the heated fluid for the jacket.

Having thus briefly described our invention, what we claim and desire to secure by Letters Patent of the United States is—

1. In pasteurizing apparatus, a receptacle for the liquid to be pasteurized having a bottom wall inclined to the horizontal, an agitator adjacent the bottom of the receptacle, a shaft extending upwardly therefrom at an angle to the vertical axis of the receptacle with the agitator at a right angle to the shaft and approximately parallel with said inclined bottom wall whereby rotation of the shaft and agitator causes the liquid to flow in a generally upward direction from the lowest point swept by the agitator toward the opposite side and upper end of the receptacle and thence across the said upper end and downward to the agitator.

2. In pasteurizing apparatus, a cylindrical receptacle for the liquid to be pasteurized, a second cylindrical receptacle in which the first receptacle is placed with the walls in concentric spaced relation, the said receptacles having the common axis thereof in vertical position, the bottom of the inner receptacle being inclined to the horizontal, an agitator blade in the inner receptacle in parallel spaced relation with the bottom thereof rotatable about an axis at a right angle to the bottom and therefore at an angle to the vertical axis of the receptacle, and driving means therefor supported at the upper end of the receptacle.

3. In pasteurizing apparatus, a receptacle for liquid to be pasteurized having a bottom wall inclined to the horizontal, an agitator blade adjacent the said bottom wall, a shaft extending upwardly at an angle to the vertical axis of the receptacle and at a right angle to the blade whereby rotation of the agitator causes movement of the liquid from the lowest point swept by the blade toward the opposite side and upper end of the receptacle, and a baffle plate positioned above the blade and extending substantially centrally across the receptacle providing a means for deflecting the central portion of the rotating body toward the outside to contact the receptacle wall.

4. In pasteurizing apparatus, a cylindrical receptacle for the liquid to be pasteurized the axis of which is positioned vertically and having a bottom inclined to the horizontal, an agitator blade lying in parallel spaced relation with the bottom of the receptacle and rotatable on an axis at a right angle to the said bottom, a baffle plate extending practically centrally across the receptacle approximately midway of its height and lying at a relatively sharp angle to the vertical axis, rotation of the agitator causing liquid to rotate about an axis transversely of the vertical axis of the receptacle, the baffle plate occupying a plane practically centrally of the rotating liquid body whereby the central portion of the body of fluid is deflected in its path of rotation toward the wall of the receptacle, and a driving means for the agitator.

5. In pasteurizing apparatus, a cylindrical receptacle for liquid to be pasteurized, the axis of which is positioned vertically, said receptacle having a bottom inclined to the horizontal, an agitator blade in the receptacle in parallel relation with and adjacent to the bottom, means for rotating the blade on an axis at substantially a right angle to the said bottom, a driving means for the said blade comprising a shaft, a motor positioned above the receptacles, a gear train interposed between the motor and the agitator shaft, a pump, and means operable at will for connecting or disconnecting the gear train and the pump.

6. In pasteurizing apparatus, a cylindrical receptacle for liquid, the axis of which is practically in a vertical plane, an agitator shaft rotatable about an axis inclined to the axis of the receptacle, an agitator blade adjacent the bottom end of the shaft and rotatable about the axis of the shaft in a plane at a right angle thereto, said receptacle having a bottom wall at a right angle to the shaft, and means for rotating the shaft.

In testimony whereof we sign this specification.

JOHN W. LADD.
HENRY B. WILLIAMS.